United States Patent [19]

Inoue et al.

[11] Patent Number: 4,849,890
[45] Date of Patent: Jul. 18, 1989

[54] ANTI-SKID BRAKING SYSTEM FOR AUTOMOTIVE VEHICLE

[75] Inventors: Hideo Inoue, Yamakita; Koyoyuki Uchida, Susono; Tatsuo Sugitani, Mishima, all of Japan

[73] Assignee: Toyota Jidosha Kabushiki Kaisha, Toyota, Japan

[21] Appl. No.: 98,861

[22] Filed: Sep. 21, 1987

[30] Foreign Application Priority Data

Sep. 20, 1986 [JP] Japan .................. 61-222750

[51] Int. Cl.$^4$ .................................. B60T 8/70
[52] U.S. Cl. .................... 364/426.02; 364/426.01; 303/95; 303/105
[58] Field of Search ............ 364/426, 426.02, 426.01; 180/197; 303/95, 97, 105, 109; 361/238

[56] References Cited

U.S. PATENT DOCUMENTS

| | | | |
|---|---|---|---|
| 4,193,642 | 3/1980 | Miller | 303/97 |
| 4,327,414 | 4/1982 | Klein | 303/97 X |
| 4,530,059 | 7/1985 | Brearley et al. | 303/97 X |
| 4,552,413 | 11/1985 | Fujii et al. | 364/426 X |
| 4,672,547 | 6/1987 | Masaki et al. | 303/97 X |
| 4,673,226 | 6/1987 | Every et al. | 364/426 X |
| 4,729,608 | 3/1988 | Fennel et al. | 364/426 X |
| 4,739,484 | 4/1988 | Fennel | 364/426 |
| 4,740,040 | 4/1988 | Arikawa | 303/97 X |

FOREIGN PATENT DOCUMENTS

| | | | |
|---|---|---|---|
| 2519731 | 11/1975 | Fed. Rep. of Germany | 303/97 |
| 0053944 | 5/1981 | Japan | 303/109 |
| 0045456 | 3/1985 | Japan | 303/109 |

*Primary Examiner*—Eugene R. LaRoche
*Assistant Examiner*—Seung Ham
*Attorney, Agent, or Firm*—Oblon, Spivak, McClelland, Maier & Neustadt

[57] ABSTRACT

A method of automatically controlling a braking system for an automotive vehicle, by changing a plurality of control parameters in at least two steps, depending upon a determined one of three or more ranges of a variable in which a detected value of the variable falls. At least one of the control parameters is changed in two steps corresponding to two adjacent ranges of the variable, while at least one of the other control parameter or parameters is kept unchanged for the two adjacent ranges of the variable. The variable may be a deceleration rate of the vehicle, or other variables which are changed with a coefficient of friction between a vehicle wheel and the road surface. The control parameters may include an upper limit of the deceleration rate, and a duration for which the braking pressure is reduced, to prevent locking of the wheel due to excessive braking force applied to the wheel, or prevent an excessive amount of slip of the wheel due to excessive drive torque applied to the drive wheel during start or acceleration of the vehicle.

8 Claims, 7 Drawing Sheets

ANTI-SKID BRAKING SYSTEM FOR AUTOMOTIVE VEHICLE

BACKGROUND OF THE INVENTION

1. Field of the Invention

The present invention relates to a method for performing automatic brake control, such as anti-lock control or traction control, in an automotive vehicle. More particularly, the invention is concerned with improvements in the method for controlling a braking system, by changing a plurality of control parameters in two or more steps, depending upon a specific one of a plurality of ranges in which a current value of a given variable falls.

2. Discussion of the Prior Art

A braking system for a motor vehicle is controlled so as to automatically regulate the braking pressures for the wheels, for anti-lock control, traction control or other purposes. The anti-lock control is interpreted to mean automatic regulation of the braking forces applied to the wheel brakes, during brake application to the vehicle, so as to prevent the braking forces from exceeding upper limits, beyond which a ratio of slip of the wheels on the road surface exceeds a permissible level. On the other hand, the traction control is performed for automatically activating the wheel brakes to more or less resist drive forces of the drive wheels, upon acceleration of the vehicle, in order to prevent an excessive slip ratio of the drive wheels due to an excessive torque applied to the drive wheels.

To achieve such automatic control operations of the braking system for a motor vehicle, some control parameters are used. In an anti-lock control, for example, an upper limit of a deceleration rate of the vehicle, and a time during which the braking pressures are reduced, are used as the control parameters to regulate the braking pressures. Described in more detail, the highest one of the rotating speeds of all wheels is presumed to represent the actual running speed of the vehicle. When the deceleration rate of the presumed speed of the vehicle exceeds a preset upper limit, the deceleration rate is fixed at that preset upper limit, and the running speed of the vehicle is presumed based on that upper limit. In this way, the upper limit of the deceleration rate is used as a control parameter. In the meantime, when the rotating speed of a given wheel deviates from the presumed running speed of the vehicle by a predetermined amount, the braking pressure for that wheel is reduced for a suitable length of time. Thus, the pressure-reducing time between the start and the end of the pressure reduction is used as another control parameter. Usually, these control parameters are changed depending upon a change of a given variable such as a rotating speed of the wheel, a rate of acceleration or deceleration of the vehicle, or a time lapse after a control cycle is started. For economical control arrangement, it is desirable that the control parameters are changed in two or more steps which correspond to a plurality of ranges of the selected variable. Namely, the parameters are changed depending upon a specific one of the ranges in which the currently detected variable falls.

The foregoing situations apply to the traction control, or other automatic control operations of the braking system.

In an effort to accomplish an optimum anti-lock control operation of an anti-lock braking system, the present inventors attempted to use a deceleration rate of a rotating speed of each wheel as a variable, and the above-indicated upper limit of the deceleration rate and pressure-reducing time as control parameters. To this end, the vehicle is provided with a deceleration sensor for detecting an actual rate of deceleration of the vehicle. Further, three ranges (first, second and third ranges) are established for the detected deceleration rate G, so that the detected rate falls within one of the three ranges. The upper limit of the deceleration rate and the pressure-reducing time, as the control parameters, are changed in three steps which correspond to the three ranges of the detected deceleration rate G, as indicated in TABLE 1.

TABLE 1

| Range | Detected Deceleration Rate G | Upper Limit Of G | Pressure Reducing Time |
|---|---|---|---|
| First | $-0.5 \text{ g} > G$ | $-1.15 \text{ g}$ | 20 msec (short) |
| Second | $-0.2 \text{ g} > G \geqq -0.5 \text{ g}$ | $-0.8 \text{ g}$ | 50 msec (middle) |
| Third | $G \geqq -0.2 \text{ g}$ | $-0.5 \text{ g}$ | 80 msec (long) |

The above method of control in which the upper limit of the deceleration rate and the pressure-reducing time are changed in three steps, permits a generally high degree of accuracy in the anti-lock control operation of the braking system. However, the inventors discovered that the above arrangement suffers from an impermissible control error in some special cases, for example, where the coefficient of friction of the road surface suddenly changes during the anti-lock control operation, or where an error arises in the measurement of the vehicle deceleration rate by the deceleration sensor.

An investigation conducted by the inventors reveals that in such special cases, an erroneous determination is made of the range in which the detected variable (deceleration rate) falls, and the control parameters are consequently set to the inappropriate values, based on the erroneous determination. In this connection, it was found that the use of the inappropriate control parameters which deviate from the optimum values is more or less impermissible in some cases, but more or less permissible in the other cases. For instance, if the upper limit of the deceleration rate is erroneously set to $-1.15$ g while it must be set to $-0.8$ g, this error does not cause an impermissible result. Conversely, if the upper limit is erroneously set to $-0.8$ g while it must be set to $-1.15$ g, this error results in an impermissible consequence, i.e., unduly increased braking distance.

SUMMARY OF THE INVENTION

It is therefore a first object of the present invention to provide a method of controlling a braking system for an automotive vehicle, as precisely as possible, which method is adapted to prevent an impermissible consequence in the control of the braking system, as a result of an erroneous determination of an appropriate range of a detected variable.

A second object of the invention is to provide an anti-lock braking system which is adapted to practice the control method of the invention indicated above.

The first object may be attained according to the principle of the present invention, which provides a method of automatically controlling a vehicle braking system having braking control means including a plurality of braking control parameters which vary in at least two steps. The method comprises the steps of detecting a value of a predetermined variable which changes with a coefficient vehicle running condition, determining which of at least three ranges the variable falls into, the ranges coresponding into different coefficients of friction between the vehicle wheel and the road surface, changing a value of at least one of the parameters when a value of the variable moves from one to an adjacent another of the ranges, and maintaining as value of at least another of the parameters when the value of the variable moves from said one to said another of the ranges and the value of said one of the parameters is changed.

Described differently, all control parameters are not changed in a plurality of steps which correspond to the respective ranges of the variable. But, at least one of the control parameters remains unchanged for the two adjacent ranges of the variable, while each of at least one of the other control parameter or parameters is changed in two steps corresponding to the adjacent two ranges of the variable, by a relatively large amount sufficient to compensate for an undesirable effect which may arise due to the use of the same value for the above-indicated at least one control parameter.

According to the instant method, the control parameters are changed depending upon the currently detected value of the variable, which falls in one of the three or more predetermined ranges. However, each of the selected parameter or parameters is set at the same value for the two adjacent ranges of the variable. In this arrangement, the same value is used for the selected parameter, even when the controller of the braking system makes an erroneous determination as to the range in which the current value of the variable falls. Therefore, the instant control method is effective in avoiding an impermissible result which may occur when a certain control parameter is set to an inappropriate one of two different values corresponding to adjacent ranges of the variable, if an erroneous determination is made as to the range in which the actual value of the variable falls. Accordingly, the instant method permits improved accuracy and reliability in automatic control operations of the braking system of the vehicle.

According to one feature of the instant method, the variable is changed with a coefficient of friction between a wheel of the vehicle and a road surface, and the method further comprises a step of preventing an excessive amount of slip of the wheel on the road surface when a braking force applied to the wheel exceeds a permissible level determined in relation to the coefficient of friction, during application of brake to the vehicle.

According to an alternative feature of the instant method, the braking system includes a wheel brake for a drive wheel of the vehicle, and the variable is changed with a coefficient of friction between the drive wheel and a road surface. The method further comprises a step of preventing an excessive amount of slip of the drive wheel on the road surface when a drive torque applied to the drive wheel exceeds a permissible level determined in relation to the coefficient of friction, during acceleration of the vehicle.

The second object of the invention may be achieved according to another aspect of the invention, which provides an anti-lock braking system for an automotive vehicle, comprising: (a) a plurality of hydraulically operated brakes provided for a plurality of wheels of the vehicle; (b) a plurality of actuators provided for a corresponding plurality of groups of brakes each group including at least one of the plurality of brakes, each of the actuators being operable for controlling a braking pressure or pressures of the at least one brake of the corresponding group; (c) a plurality of speed sensors, at least one of which is provided corresponding to each of the plurality of actuators, for detecting rotating speeds of the wheels; (d) a controller comprising means for determining by a highest one of the speeds of the wheels detected by the speed sensors; after a deceleration rate of the highest speed has exceeded a preset upper limit, fixing the deceleration rate of the vehicle at the preset upper limit, and estimating actual running speed of the vehicle, based on the upper limit; calculating an amount of slip of each of the wheels based on a difference between the estimated running speed of the vehicle and the detected speed of the each wheel, and controlling each of the in accordance with a plurality of actuators so as to prevent at least one of the wheels which corresponds to the each actuator from locking on a road surface; and (e) parameter setting means for changing a plurality of control parameters in at least two steps, depending upon a determined one of three or more ranges of a variable in which a detected value of the variable falls, the variable being changed with a coefficient of friction between each wheel and the road surface, the ranges corresponding to different coefficients of friction between the road wheel and the road surface. The parameter setting means comprise means for changing a value of at least one of the plurality of control parameters when said value of the variable moves from one to an adjacent another of the at least three ranges and for maintaining at least one other control parameter unchanged when the value of said variable moves from said one to another of the at least three ranges.

The variable may be a rate of deceleration of the vehicle, or the braking pressure applied to the brake for each wheel.

According to one feature of the instant braking system, the above-indicated at least one of the control parameters includes the upper limit of the decleration rate of the vehicle, and the above-indicated at least one of the other control parameter or parameters includes a pressure-reducing time during which the braking pressure for the each wheel is reduced.

BRIEF DESCRIPTION OF THE DRAWINGS

The above and optional objects, features and advantages of the present invention will be better understood by reading the following detailed description of presently preferred embodiments of the invention, when considered in conjunction with the accompanying drawings, in which.

DETAILED DESCRIPTION OF THE PREFERRED EMBODIMENTS

Figure 1:
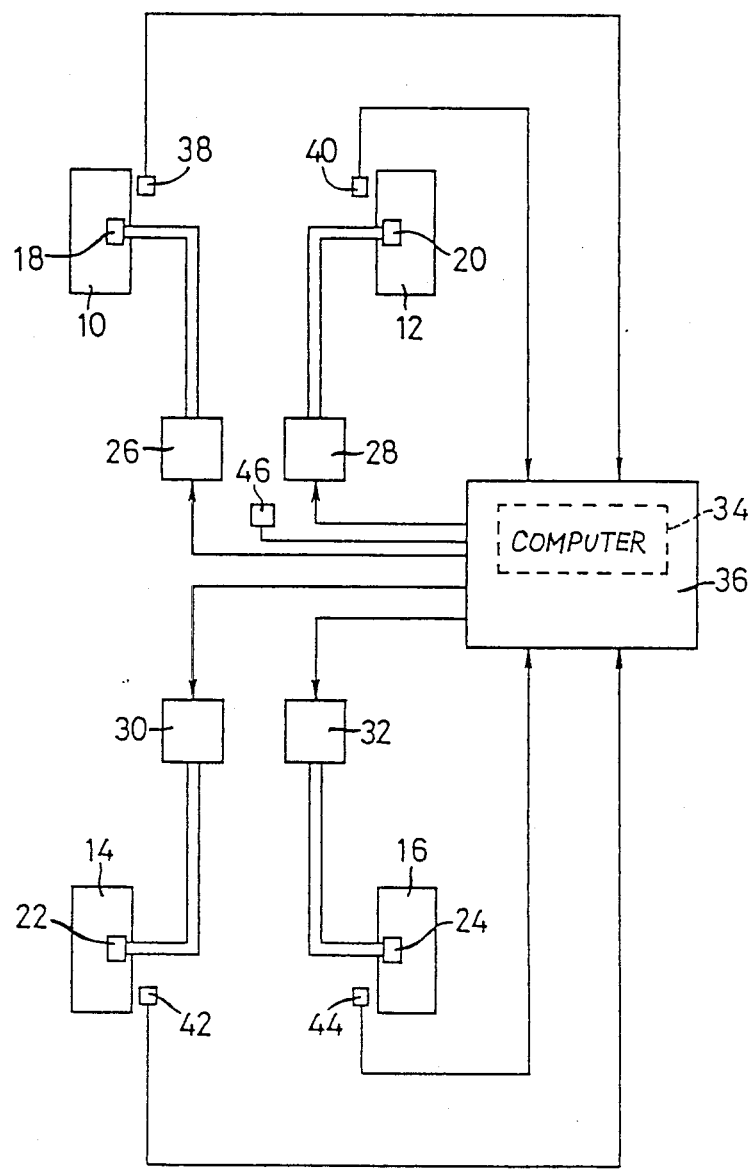
FIG. 1 is a diagrammatic view showing an anti-lock braking system for an automotive vehicle, which is controlled according to one embodiment of a method of the present invention.

Referring to the diagrammatic view of FIG. 1, there is shown the presently preferred embodiment of an anti-skid or anti-lock braking system of the present invention for a four-wheel drive vehicle. In the figure, reference numerals 10, 12, 14 and 16 designate a left-front wheel, a right-front wheel, a left-rear wheel and a right-rear wheel, respectively. These wheels 10, 12, 14 and 16 are provided with respective hydraulically operated wheel brakes 18, 20, 22 and 24. The pressures of brake fluid in these brakes 18, 20, 22, 24 are regulated, or increased or decreased by respective actuators 26, 28, 30 and 32, which are controlled by a control device 36 whose major portion is constituted by a computer 34. To this controller 36, there are connected speed sensors 38, 40, 42 and 44, and a vehicle-deceleration detecting device 46.

Figure 2:
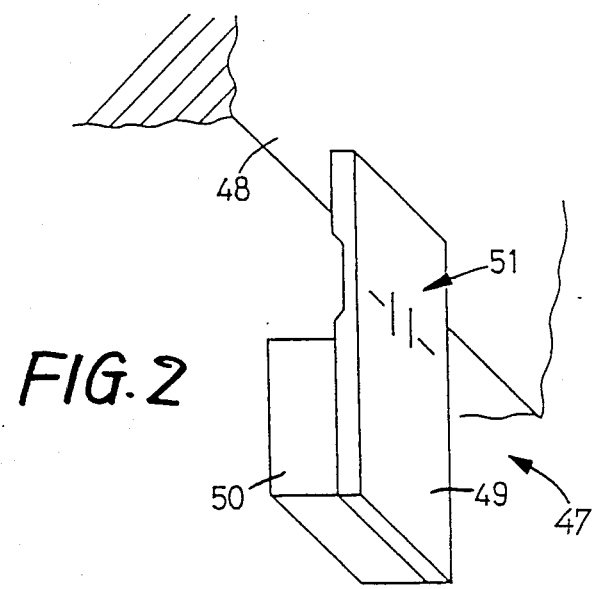
FIG. 2 is a schematic perspective view schematically showing a detecting head of a vehicle-deceleration detecting device used in the braking system of FIG. 1.
Figure 3:
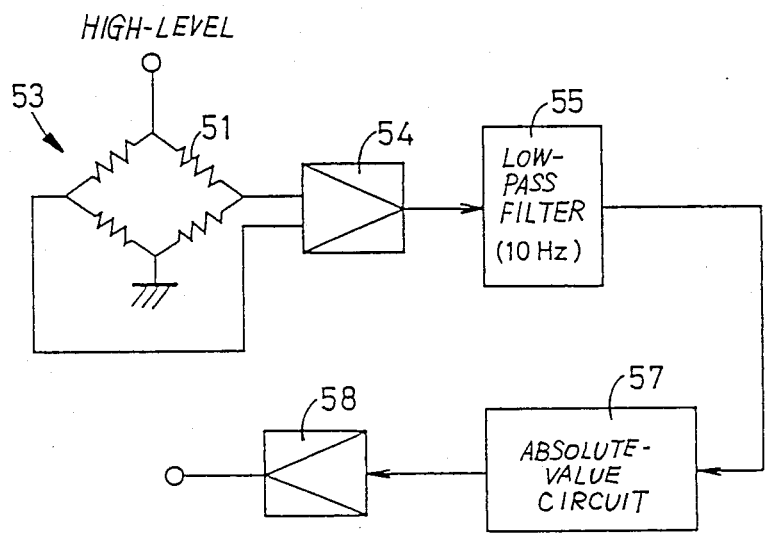
FIG. 3 is a block diagram illustrating a processing circuit of the vehicle-deceleration detecting device.

The detecting device 46 includes a detecting head 47 shown in FIG. 2, and a processing circuit shown in FIG. 3. The detecting head 47 has a base 48 fixed to the body of the vehicle, and a silicon wafer 49 secured at its one end to the base 48, such that the other or free end projects from the base 48. The silicon wafer 49 is oriented such that its major opposite surfaces face in the opposite front and rear directions of the vehicle. The silicon wafer 49 carries at its free end a weight 50 fixed thereto, and has a diffusion resistor 51 formed on a part of its surface adjacent to the fixed end. The detecting head 47 is adapted such that the silicon wafer 49 is deformed or flexed due to an inertia of the weight 50, when the vehicle is accelerated or decelerated. As a result, the resistance of the diffusion resistor 51 is changed. The processing circuit includes a bridge 53 having the diffusion resistor 51 as one of its four arms, and further includes an amplifier 54, a low-pass filter 55, an absolute-value circuit 57 and an amplifier 58, for processing output voltages of the bridge 51. The amplifier 58 provides an output voltage which is proportional to a rate of acceleration or deceleration of the vehicle.

Figure 4:
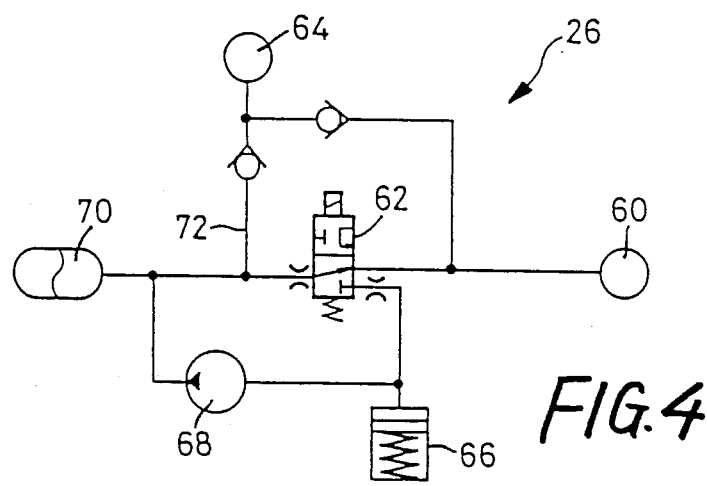
FIG. 4 is a diagrammatic view illustrating details of a hydraulic circuit of one type of actuator used in the braking system of FIG. 1.
Figure 5:
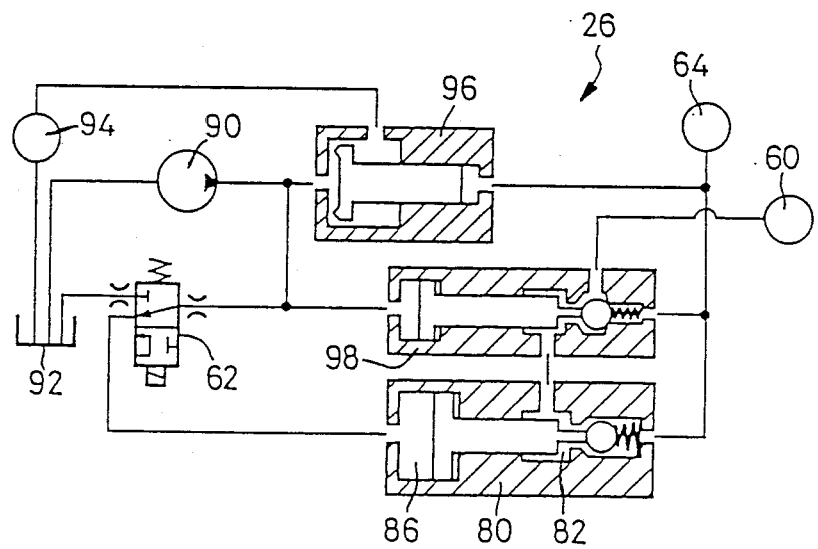
FIG. 5 is a diagrammatic view illustrating a hydraulic circuit of another type of actuator used in place of the actuator of FIG. 4.

The actuator 26 may be of either a "closed-circuit" type as shown in FIG. 4, or a "variable-volume" type as shown in FIG. 5. The other actuators 28, 30 and 32 are identical with the actuator 26 as shown in FIGS. 4 or 5. However, it is possible that some of the elements as shown in FIGS. 4 or 5 are commonly used for all of the four actuators 26, 28, 30, 32.

The actuator 26 of the "closed-circuit" type of FIG. 4 is adapted such that a wheel brake cylinder 60 for activating the brake 18 is brought into communication with a master cylinder 64 or a reservoir 66, selectively, by a solenoid-operated directional control valve 62. The pressure in the wheel brake cylinder 60 is increased as the pressurized brake fluid is fed from the master cylinder 64 into the brake cylinder 60, and is decreased as the brake fluid is discharged from the brake cylinder 60 into the reservoir 66. The brake fluid in the reservoir 66 is pumped by a pump 68, and is stored in an accumulator 70. The fluid in the accumulator 70 is returned as needed, to a main fluid passage 72 which connects the master cylinder 64 and the brake cylinder 60. This is the reason why the actuator of FIG. 4 is called the "closed-circuit" type.

On the other hand, the actuator 26 of the "variable-volume" type of FIG. 5 is adapted such that the pressure of the brake fluid in the brake cylinder 60 is regulated by changing the volume of a brake-pressure chamber 82 in a regulator 80. The regulator 80 has a pressure chamber 86 which is brought into communication with a pump 90 or a reservoir 92, selectively, by the solenoid-operated directional control valve 62. The pressure in the brake-pressure chamber 82, that is, the pressure in the brake cylinder 60 is increased or decreased by controlling the pressure in the pressure chamber 86. In this type of actuator, the pump 90 is used primarily for operating a power steering device 94 of the vehicle. The actuator 26 has a regulator 96 which is normally placed in a position in which the pressurized fluid generated by the pump 90 is allowed to freely flow through the regulator 96 to the power steering device 94. The fluid of the pressure proportional to the pressure in the master cylinder 64 is delivered from the pump 90 to the pressure chamber 86 through the solenoid-operated directional control valve 62, only when a pressure is built up in the master cylinder 64 upon depression of a brake pedal provided on the vehicle. Reference numeral 98 indicates a by-pass valve which permits the fluid pressure in the master cylinder 64 to be applied to the brake cylinder 60 without passing through the regulator 80, in the event of a failure of the pump 90 or any other trouble with the actuator 26.

Figure 6:
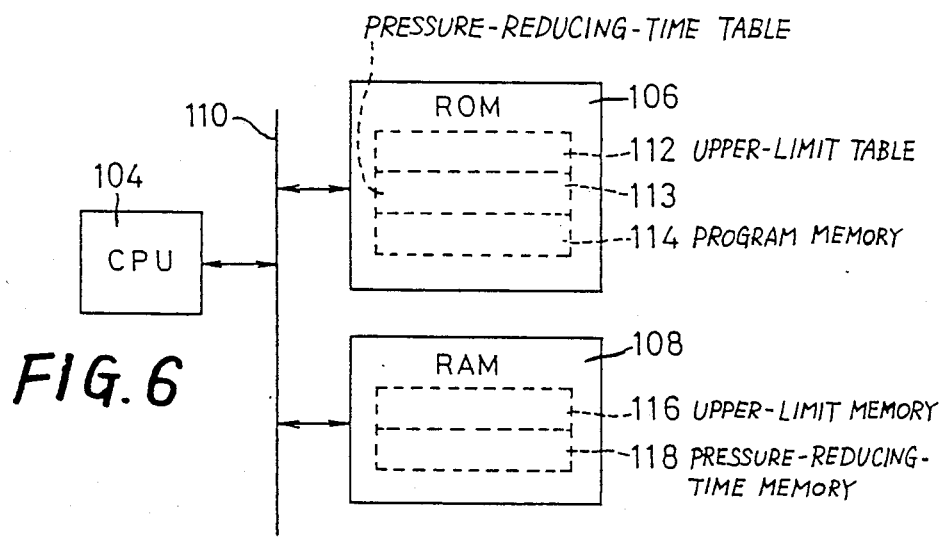
FIG. 6 is a view showing details of a computer used in the braking system of FIG. 1.

As shown in FIG. 6, the computer 34 indicated above consists of a central processing unit (CPU) 104, a read-only memory (ROM) 106, a random-access memory (RAM) 108 and a bus 110. The ROM 106 has an upper-limit table 112, a pressure-reducing-time table 113, a program memory 114, and other memories. As indicated in TABLE 2, the upper-limit table 112 and the pressure-reducing-time table 113 respectively store upper limit values of the deceleration rate, and pressure-reducing times, which correspond to three (first, second and third) ranges of the detected deceleration rates G of the vehicle. The pressure-reducing times are the durations during which the braking preessure in each brake 18, 20, 22, 24 is reduced.

TABLE 2

| Range | Detected Deceleration Rate G | Upper Limit Of G | Pressure Reducing Time |
|---|---|---|---|
| First | −0.5 g > G | −1.15 g | 20 msec (short) |
| Second | −0.2 g > G ≧ −0.5 g | −1.15 g | 80 msec (middle) |
| Third | G ≧ −0.2 g | −0.5 g | 80 msec (long) |

Figure 7:
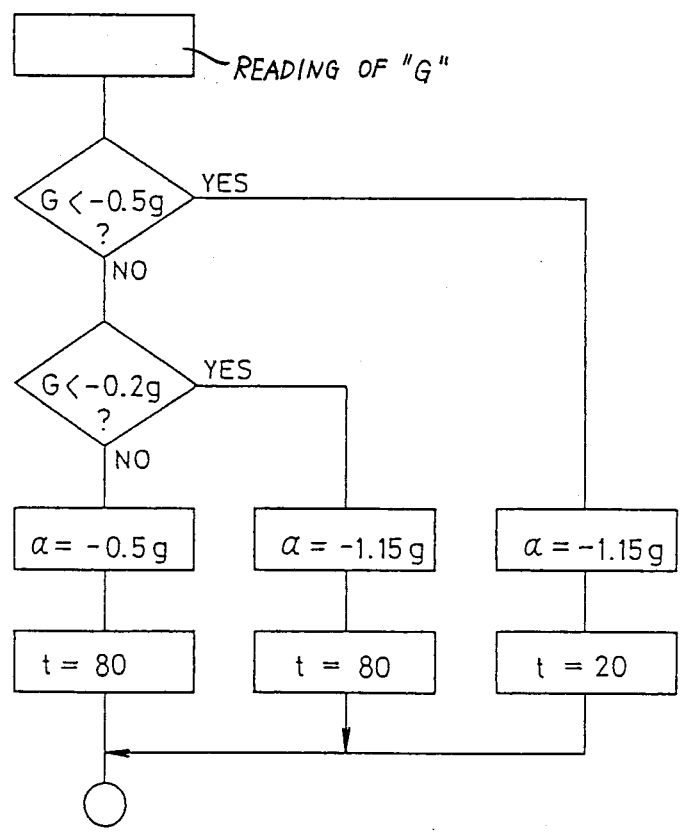
FIG. 7 is a flow chart representing a part of a control program stored in a program memory of the computer of FIG. 6, for effecting a sub-routine for determining the upper limit of the vehicle deceleration and the pressure-reducing time.

The program memory 114 stores a control program for controlling the actuators 26, 28, 30, 32, as well as a program for effecting a sub-routine shown in the flow chart of FIG. 7. Since the control program for the actuators 26, 28, 30, 32 is well known, and is not essential to the understanding of the principle of the present invention, no detailed description of this control program will be provided. The RAM 108 includes an upper-limit memory 116 for storing the selected upper limit of the deceleration rate, and a pressure-reducing-time memory 118 for storing the selected pressure-reducing time.

Figure 8:
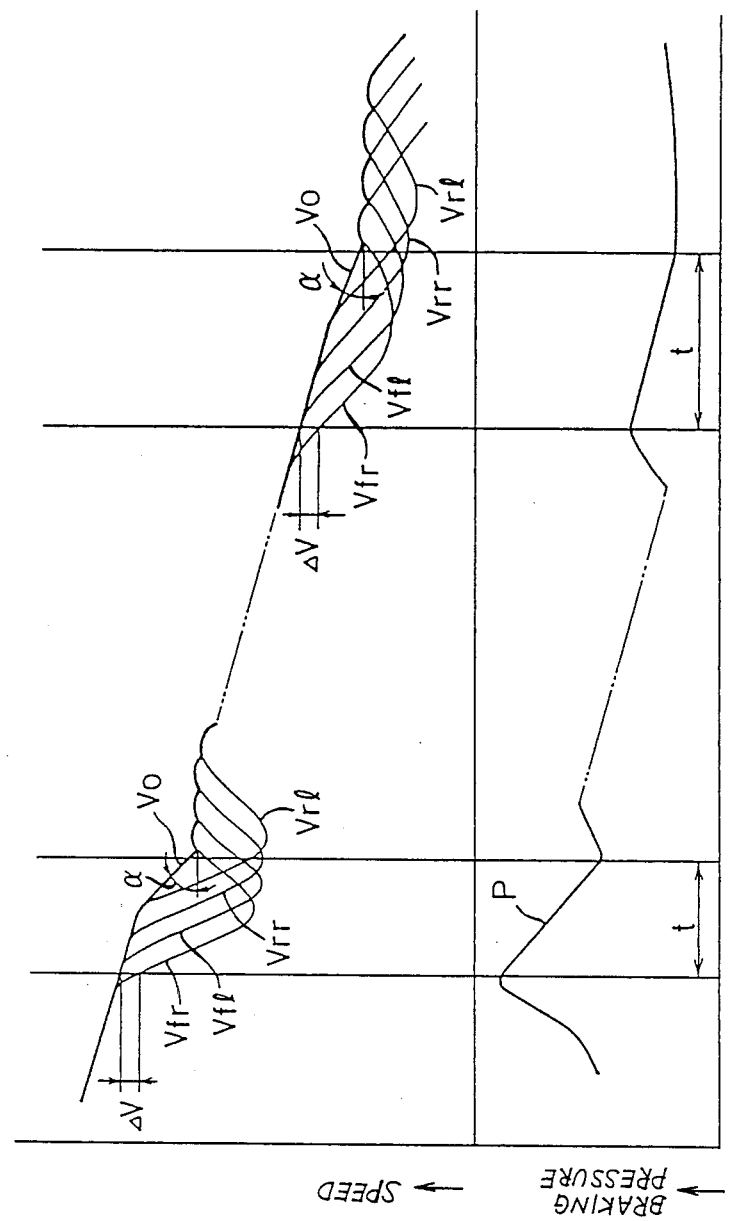
FIG. 8 is an explanatory illustration indicating a relationship among the rotating speed of each wheel of the vehicle, the presumed running speed of the vehicle and the brake cylinder pressure, in the embodiment shown in FIGS. 1 through 7.

Referring next to FIG. 8, an operation of the braking system constructed as described above will be discribed. Reference characters used in FIG. 8 designate the following:

Vo: Presumed running speed of the vehicle (represented by the rotating speed of a wheel)
Vfr: Rotating speed of the right-front wheel 12
Vfl: Rotating speed of the left-front wheel 10
Vrr: Rotating speed of the right-rear wheel 16
Vrl: Rotating speed of the left-rear wheel 14
$\alpha$: Upper limit of the deceleration rate
t: Pressure reducing time
P: Braking pressure When the fluid pressures in the brakes 18, 20, 22, 24 are raised to apply brake to the vehicle, the running speed of the vehicle is lowered while all the wheels of the vehicle are rotated at the same speed, unless the braking forces applied to the wheels are excessively large. If excessively large braking forces are applied, the rotating speeds of the wheels deviate from the running speed of the vehicle, one after another, as indicated in FIG. 8. In the present specific example of FIG. 8, the deviation occurs in the order of the speeds Vfr, Vfl, Vrr and Vrl of the respective right-front, left-front, right-rear and left-rear wheels 12, 10, 16 and 14 (in the order of description). The speed changes shown on the left side in FIG. 8 are those which occur when the deceleration rate G is comparatively high, while the speed changes shown on the right side are those which occur when the deceleration rate G is comparatively low.

As long as the two or more wheels are rotating at a same speed, the CPU 104 of the computer 34 presumes that the speed of these two or more wheels represents the actual running speed of the vehicle. The CPU 104 repeatedly compares the rotating speed of each wheel with the presumed running speed Vo of the vehicle. When the CPU 104 detects that the speed of any one of the wheels becomes lower than the presumed speed Vo by a predetermined value $\Delta V$, the CPU 104 applies a pressure-reducing signal to the actuator 26, 28, 30, 32 which corresponds to the wheel whose speed has been excessively lowered. As a result, the braking pressure in the brake 18, 20, 22, 24 for the wheel in question is lowered, permitting the speed of the wheel to increase. As soon as the CPU 104 has generated the pressure-reducing signal, the CPU 104 starts executing the sub-routine shown in the flow chart of FIG. 7.

In the example of FIG. 8, the CPU 104 of the computer 34 executes the sub-routine of FIG. 7 for the first time, when the speed Vfr of the right-front wheel 12 becomes lower than the presumed speed Vo by the predetermined value $\Delta V$. Initially, the CPU 104 reads in the deceleration rate G currently detected by the vehicle-deceleration detecting device 46, and determines the upper limit $\alpha$ and the pressure-reducing time t, based on the relationships stored in the upper-limit table 112 and the pressure-reducing-time table 113. That is, the CPU 104 selects the upper limit and time which correspond to one of the first, second and third ranges within which the detected deceleration rate G falls. The determined upper limit $\alpha$ and the time t are stored in the upper-limit memory 116 and the pressure-reducing-time memory 118, respectively. The same steps are subsequently implemented when the speeds Vfl and Vrr of the left-front and right-rear wheels 10, 16 become lower than the presumed speed Vo by the predetermined value $\Delta V$. The determined or selected upper limits $\alpha$ and the times t are also stored in the respective memories 116, 118. In this connection, it is noted that the newly determined upper limit $\alpha$ replaces the previously determined upper limit $\alpha$ already stored in the memory 116, whereby the data stored in the memory 116 is updated. On the other hand, the pressure-reducing-time memory 118 have memory sections assigned for storing the times t for the four wheels 10, 12, 14, 16.

When the rotating speed Vrr of the right-rear wheel 16 becomes lower than the rotating speed Vrl of the left-rear wheel 14 during execution of the sub-routine of FIG. 7, only the left-rear wheel 14 has the highest speed. After the moment when only one of the four wheels, i.e., left-rear wheel 14 has the highest speed, the CPU 104 repeatedly calculates the deceleration rate G of the left-rear wheel 14. When the currently calculated deceleration rate G of this wheel 14 exceeds the upper limit presently stored in the upper-limit memory 116 (i.e., the upper limit which was stored when the speed Vrr of the right-rear wheel 16 had become lower than the presumed speed Vo by the predetermined value $\Delta V$), the CPU 104 fixes the deceleration rate at the upper limit stored in the memory 116, and repeats to presume or calculate the actual vehicle speed, based on the fixed upper limit. Therefore, the presumed running speed Vo of the vehicle is represented by a straight line which has a gradient or slope equal to the fixed upper limit $\alpha$, as indicated in FIG. 8. It is assumed that the presumed vehicle speed Vo is lowered comparatively rapidly as indicated in an upper-left portion of FIG. 8, when the fixed upper limit $\alpha$ is relatively high, while the presumed vehicle speed Vo is lowered comparatively slowly as indicated in a lower-right portion of FIG. 8, when the fixed upper limit $\alpha$ is relatively low. As soon as the CPU 104 has determined to fix the deceleration rate at the above-indicated upper limit, the pressure-reducing time t for the wheel 14 is made equal to that for the right-rear wheel 16.

In the meantime, the CPU 104 of the computer 34 measures durations during which pressure-reducing signals have been applied to the actuators 26, 28, 30, 32. When the measured durations become equal to the corresponding pressure-reducing times t stored in the memory 118, the CPU 104 removes the pressure-reducing signals, and applies pressure-increasing signals to the appropriate actuators 26, 28, 30, 32. As indicated in a lower-left portion of FIG. 8, the braking pressure abruptly or rapidly drops when the braking pressure at the time of generation of a pressure-reducing signal is comparatively high. At the same time, the comparatively high braking pressure permits a comparatively high rate of deceleration of the vehicle. For this reason, the pressure-reducing time t is shortened with an increase in the braking pressure, i.e., with an increase in the detected deceleration rate G, according to the flow chart of FIG. 7. That is, the pressure-increasing signal is generated after the braking pressure has been lowered by a suitable amount determined by the pressure-reducing time t. Conversely, if the braking pressure at the time of generation of the pressure-reducing signal is comparatively low, the signal is applied for a relatively long time t, and consequently the braking pressure can be lowered by a suitable or sufficient amount prior to the generation of the pressure-increasing signal, even though the pressure reducing rate is relatively low as indicated in a lower-right portion of FIG. 8.

Subsequently, the speed of one of the four wheels, in this example of FIG. 8, the speed Vfr of the right-front wheel 12 exceeds the presumed vehicle speed Vo, and the CPU 104 of the computer 34 presumes that the vehicle speed is represented by the speed of the right-front wheel 12. When the speed Vfl of the left-front wheel 10 subsequently exceeds the speed Vfr of the right-front wheel 12, then the speed Vfl is presumed to represent the vehicle speed Vo.

As described above, the CPU 104 repeatedly presumes the actual running speed of the vehicle, and compares the speed of each wheel with the presumed vehicle speed Vo, in order to control the actuators 26, 28, 30, 32 so as to avoid an excessive amount of slip of the wheels 10, 12, 14, 16 on the road surface. Since the upper limit α of the deceleration rate of the vehicle is determined based on the actually detected deceleration rate, the upper limit can be set close to the actual deceleration rate, and the actual vehicle speed can be presumed with accordingly improved accuracy, whereby the anti-skid braking system can be precisely controlled for efficient braking of the vehicle without locking of the wheels.

Further, the pressure-reducing times t between the application of the pressure-reducing signals to the actuators 26, 28, 30, 32, and the application of the pressure-increasing signals, are suitably determined also based on the actually detected deceleration rate of the vehicle, whereby the braking pressures in the brakes 18, 20, 22, 24 can be lowered by optimum amounts. Thus, the instant arrangement eliminates excessive or insufficient amounts of drop of the braking pressures, which result in an increased braking distance of the vehicle, or an unstable braking action due to locking or skidding of the wheels.

Figure 9:
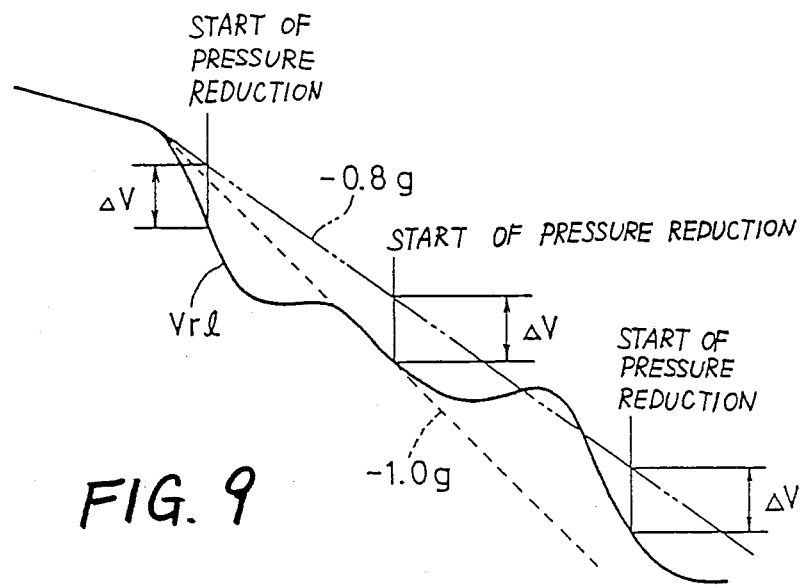
FIGS. 9 and 10 are graphs for explaining advantages of the method of the above embodiment, where an error arises in the measurement of the deceleration rate of the vehicle.

In the illustrated embodiment, the upper limit of the deceleration rate is set at −1.15 g when the detected deceleration rate G of the vehicle falls within the first or second range. Namely, the upper limit is used when the detected rate G falls within one of the first and second ranges. This arrangement is effective when an error occurs in the measurement of the actual deceleration rate G by the vehicle-deceleration detecting device 46, due to vibrations of the vehicle body, for example. In such a case, the CPU 104 may erroneously determine that the detected deceleration rate G falls in the second range, while the actual deceleration rate G in fact falls in the first range. In this event, the above-indicated arrangement prevents an undesirable increase of the actual braking distance to an unnecessarily large extent, even though the CPU 104 has erroneously determined the actual deceleration rate. Described in greater detail, it is theoretically preferred that the upper limit corresponding to the second range of the detected deceleration rate G be set at −0.8 g, as indicated in TABLE 1. If the upper-limit table 112 stores the theoretically desired relationship between the detected deceleration rate G and the upper limit, as indicated in TABLE 1, and where the above-indicated erroneous determination is made with respect to the actual deceleration rate, the anti-skid control of the braking system is implemented based on the determination that the upper limit of the deceleration rate G is −0.8 g, even though the actual coefficient of friction of the road surface is high enough to permit a higher deceleration rate, for example, −1.0 g. In this case, therefore, the actual deceleration rate is limited to −0.8 g, which is lower than the actually possible maximum rate of −1.0 g, and the braking distance is unduly elongated, as illustrated in FIG. 9. To the contrary, the present embodiment uses the upper limit of −1.15 g for the second range, which is the same as that for the first range. Accordingly, the anti-skid or anti-lock control of the braking system is achieved based on the upper limit of −1.15 g, even where the erroneous measurement of the actual deceleration rate by the detecting device 46 caused an erroneous determination that the detected rate falls in the second range, while the actual rate is in the first range. Consequently, the instant method of controlling the anti-skid braking system is capable of avoiding an undesirable, unduly long braking distance as experienced in the above-indicated arrangement based on the upper limit data as indicated in TABLE 1.

Figure 10:
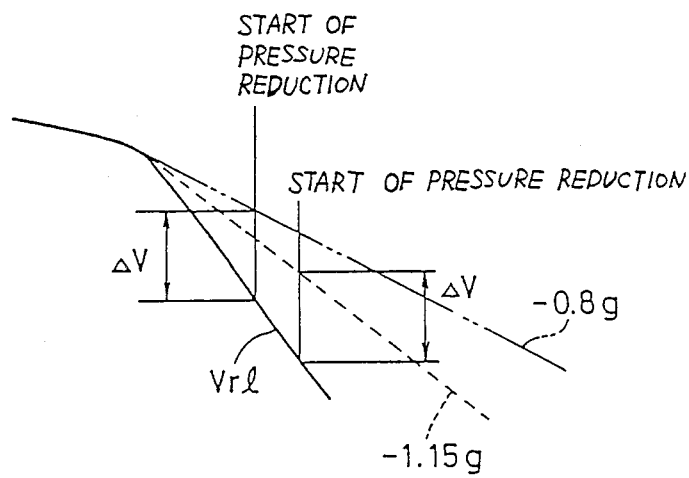

Since the upper limit of −1.15 g is used for the second range, in place of the theoretically optimum value of −0.8 g, it will be apparent that the timing at which a pressure-reducing signal is applied to the actuator for the highest-speed wheel (left-rear wheel 14, in this specific example) is slightly retarded as indicated in FIG. 10, and that a subsequent rise in the braking pressure for that wheel tends to be slightly excessive. However, the pressure-reducing time for the second range is as long as that used for the third range, whereby the amount of pressure reduction for the above wheel is accordingly increased, so as to compensate for the excess in the subsequent rise of the pressure. Therefore, the instant control method provides an almost optimum manner of controlling the anti-skid braking system.

Furthermore, the use of the same long pressure-reducing time for the second range as well as for the third range is also effective to prevent the wheel from skidding or locking when the erroneous determination of the actual deceleration rate is made. That is, while the actual deceleration rate falls within the third range, the pressure-reducing time must be sufficiently long since the level of the braking pressure is relatively low. If the pressure-reducing time table 113 stores the relationship as indicated in TABLE 1, and where the CPU 104 erroneously determines that the detected deceleration rate G falls within the second range while the actual deceleration rate G falls within the third range, the pressure reduction for the anti-skid control in this condition is effected for an insufficient length of time, and the braking pressure is not reduced by a sufficient amount, whereby the wheel tends to lock on the road surface. To the contrary, the present embodiment uses the same pressure-reducing time for both of the second and third ranges, so that the reduction of the braking pressure occurs for a sufficient length of time necessary to perform an optimum anti-skid control of the braking system while preventing the wheel from locking or skidding, even where the above erroneous determination of the actual deceleration rate takes place.

The illustrated control method for the braking system is effective where the coefficient of friction of the road surface is changed during an anti-skid control of the system, as well as where an error arises in the measurement of the actual deceleration rate of the vehicle. If the tables 112 and 113 store the upper limit and time data as indicated in TABLE 1, the commencement of an anti-skid control of the braking system while the actual deceleration rate falls within the second range will cause the CPU 104 to presume the running speed of the vehicle and control the anti-skid braking system based on the upper limit of −0.8 g, even if the friction coefficient of the road surface subsequently increases to such a level that permits the vehicle to be decelerated at a rate as high as −1.0 g, which is higher than the actually used upper limit of −0.8 g. Therefore, the braking distance is unduly elongated, as in the case of an erroneous detection of the actual deceleration rate of the vehicle. According to the present control method, however, this inconvenience can be avoided, since the upper limit is set at −1.15 g even where the CPU 104 erroneously determines that the actual deceleration rate falls within the second range.

While the present invention has been described in its presently preferred embodiment, it is to be understood that the invention may be otherwise embodied.

For example, it is possible that the actuators are operable in a pressure holding mode for maintaining the braking pressure, as well as in pressure increasing and reducing modes provided in the illustrated embodiment. Further, it is possible that the actuators are operable in a selected one of four modes for effecting fast increase, slow increase, fast decrease and slow decrease of the braking pressures. In this case, various other control parameters may be used to control the braking system. Further, the braking pressure may be used as a variable in place of the deceleration rate of the vehicle, since the braking pressure at the moment when a slip ratio of the wheel starts to increase is substantially proportional to the coefficient of friction of the road surface.

Figure 11:
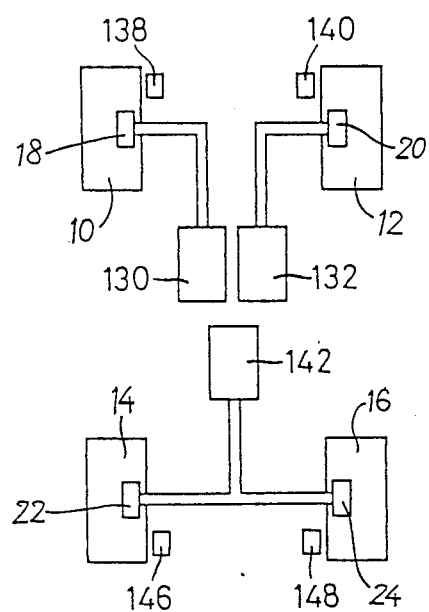
FIGS. 11 through 13 are explanatory illustrations showing arrangements of actuators and speed sensors in modified embodiments of the braking system of the invention.
Figure 12:
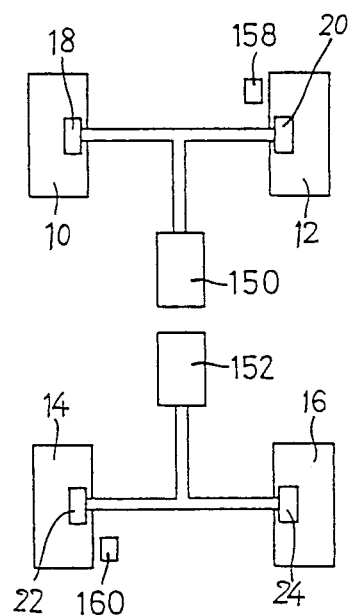
Figure 13:
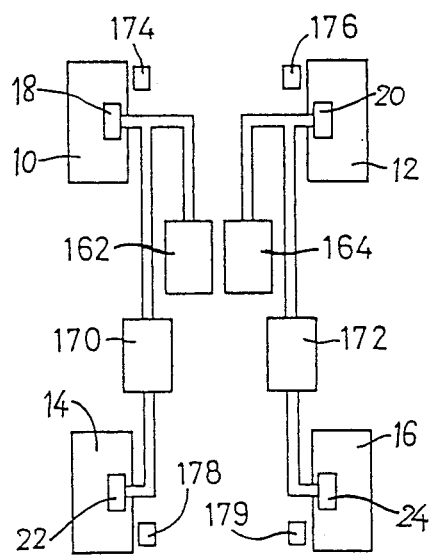

As another modification, the locations and number of the actuators and speed sensors may be changed as needed. FIGS. 11 through 13 show different modified arrangements of the actuators and speed sensors. In the braking system of FIG. 11, two actuators 130, 132 and two speed sensors 138, 140 are provided for the front wheels, respectively, while a single actuator 142 is commonly used for the two rear wheels. While two speed sensors 146, 148 are provided for the two rear wheels, these sensors may be replaced by a single sensor which is adapted to detect the speed of a propeller shaft of the vehicle.

In the braking system of FIG. 12, a single actuator 150, 152 is used commonly for each of the front and rear pairs of wheels. A speed sensor 158 is provided for the right-front wheel, while a speed sensor 160 is provided for the left-rear wheel. Obviously, it is possible to use the sensors 158, 160 for the left-front wheel and the right-rear wheel, or provide all of the four wheels with respective sensors.

In the arrangement of FIG. 13, two actuators 162, 164 are provided for the left-front and right-front wheels, respectively. The fluid pressures delivered by the actuators 162 and 164 are reduced by respective proportioning valves 170, 172, and the thus reduced fluid pressures are applied to the respective rear wheels. While four speed sensors 174, 176, 178, 179 are provided for the four wheels, respectively, it is possible to eliminate the speed sensors 178, 179 for the rear wheels, if the rear brakes are adapted to provide comparatively small braking forces.

The detecting device 46 for detecting the actual deceleration rate of the vehicle does not necessarily provide an electric signal which is varied continuously in response to a change in the deceleration rate (i.e., an infinitely variable electrical output). In this respect, it is possible to use a switch as the deceleration detector 46, whose output level is changed in at least three steps, depending upon whether the deceleration rate is higher or lower than predetermined levels.

Further, the control method of the invention may be practiced for accomplishing a traction control of the vehicle, and other control operations, such as a braking-effect control for automatically regulating the braking pressures so that the braking system provides a braking effect which is commensurate with an operating force applied to a brake operating member such as a brake pedal, irrespective of changes in the friction coefficient of the brake pads, the amount of a load exerted on the vehicle, and the slope of the road surface.

It will be understood that the present invention may be embodied with various other changes, modifications and improvements which may occur to those skilled in the art. For example, modifications may be made so as to provide a braking system suitable for a vehicle driven by two wheels.

What is claimed is:

1. A method of automatically controlling a vehicle braking system having braking control means including a plurality of braking control parameters which vary in at least two steps, said method comprising the steps of:
    detecting a value of a predetermined variable which changes with a running condition of the vehicle;
    determining which of at least three ranges said variable falls into, said ranges corresponding to different coefficients of friction between the vehicle wheel and the road surface;
    changing a value of at least one of said parameters when a value of said variable moves from one to an adjacent another of said ranges; and
    maintaining a value of at least another of said parameters when said value of said variable moves from said one to said another of said ranges and said value of said one of said parameters is changed.

2. The method of claim 1 wherein said running conditions comprises a coefficient of friction between a vehicle wheel and a road surface.

3. A method according to claim 1, wherein said variable is changed in accordance with a coefficient of friction between a wheel of the vehicle and a road surface, said method further comprising a step of preventing an excessive amount of slip of said wheel on said road surface when a braking force applied to said wheel exceeds a permissible level determined in relation to said coefficient of friction, during application of brake to the vehicle.

4. A method according to claim 1, wherein said braking system includes a wheel brake for a drive wheel of the vehicle, and said variable is changed in accordance with a coefficient of friction between said drive wheel and a road surface, said method further comprising a step of preventing an excessive amount of slip of said drive wheel on said road surface when a drive torque applied to said drive wheel exceeds a permissible level determined in relation to said coefficient of friction, during acceleration of the vehicle.

5. An anti-lock braking system for an automotive vehicle, comprising:
    a plurality of hydraulically operated brakes provided for a plurality of wheels of the vehicle;
    a plurality of actuators provided for a corresponding plurality of groups of brakes, each group including at least one of said plurality of brakes, each of said actuators being operable for controlling a braking pressure or pressures of said at least one brake of the corresponding group;

a plurality of speed sensors, at least one of which is provided corresponding to each of said plurality of actuators, for detecting rotating speeds of said wheels;

a controller comprising means for determining a highest one of the speeds of the wheels detected by said speed sensors; after a deceleration rate of said highest speed has exceeded a preset upper limit, fixing the deceleration rate of the vehicle at said preset upper limit, and estimating an actual running speed of the vehicle based on said upper limit; calculating an amount of slip of each of said wheels based on a difference between the estimated running speed of the vehicle and the detected speed of said each wheel, and controlling each of said actuators in accordance with a plurality of control parameters so as to prevent at least one of said wheels which corresponds to said each actuator from locking on a road surface; and parameter setting means for changing said plurality of control parameters in at least two steps, depending upon a determined one of at least three ranges of a detected value of a variable, said variable being changed with a coefficient of friction between said each wheel and said road surface and said ranges corresponding to different coefficients of friction between said road wheel and the road surface, said parameter setting means comprising means for changing a value of at least one of said plurality of control parameters when said value of said variable moves form one to an adjacent another of said at least three ranges and for maintaining a value of at least one other control parameter unchanged when said value of said variable moves from said one to said another of said at least three ranges.

6. An anti-lock braking system according to claim 5, wherein said variable is a rate of deceleration of the vehicle.

7. An anti-lock braking system according to claim 5, wherein said variable is said braking pressure applied to said brake for said each wheel.

8. An anti-lock braking system according to claim 5, wherein said at least one of said control parameters includes said upper limit of the deceleration rate of the vehicle, and said at least one of the other control parameter or parameters includes a pressure-reducing time during which the braking pressure for said each wheel is reduced.

* * * * *